(12) United States Patent
Matsuo

(10) Patent No.: US 8,957,957 B2
(45) Date of Patent: Feb. 17, 2015

(54) CELL OBSERVATION APPARATUS AND OBSERVATION METHOD

(75) Inventor: Yuichiro Matsuo, Tokyo (JP)

(73) Assignee: Olympus Corporation, Tokyo (JP)

( * ) Notice: Subject to any disclaimer, the term of this patent is extended or adjusted under 35 U.S.C. 154(b) by 602 days.

(21) Appl. No.: 13/179,679

(22) Filed: Jul. 11, 2011

(65) Prior Publication Data

US 2012/0013728 A1 Jan. 19, 2012

(30) Foreign Application Priority Data

Jul. 15, 2010 (JP) ................ 2010-160820

(51) Int. Cl.
*H04N 9/47* (2006.01)
*G02B 21/36* (2006.01)

(52) U.S. Cl.
CPC .................. *G02B 21/365* (2013.01)
USPC ........................................................ 348/79

(58) Field of Classification Search
USPC .............................. 356/318, 23; 382/128, 133
See application file for complete search history.

(56) References Cited

U.S. PATENT DOCUMENTS

| | | | | |
|---|---|---|---|---|
| 4,786,165 | A * | 11/1988 | Yamamoto et al. | 356/23 |
| 6,459,484 | B1 * | 10/2002 | Yokoi | 356/318 |
| 7,253,420 | B2 | 8/2007 | Motomura | |
| 7,415,144 | B2 * | 8/2008 | Imaizumi et al. | 382/128 |
| 7,447,340 | B2 * | 11/2008 | Tovar et al. | 382/128 |
| 8,022,373 | B2 | 9/2011 | Maiya | |
| 2003/0231791 | A1 | 12/2003 | Torre-Bueno | |
| 2007/0140543 | A1 | 6/2007 | D'Errico et al. | |
| 2008/0057558 | A1 | 3/2008 | Niwa et al. | |

(Continued)

FOREIGN PATENT DOCUMENTS

| | | |
|---|---|---|
| EP | 1 849 861 A1 | 10/2007 |
| EP | 1 998 165 A1 | 12/2008 |
| EP | 2 187 252 A1 | 5/2010 |
| JP | 2000-292422 A | 10/2000 |
| JP | 2005128086 A | 5/2005 |

(Continued)

OTHER PUBLICATIONS

Extended European Search Report (EESR) dated Nov. 14, 2011 (in English) in counterpart International Application No. 11005655.3.

*Primary Examiner* — Dave Czekaj
*Assistant Examiner* — Leron Beck
(74) *Attorney, Agent, or Firm* — Holtz, Holtz, Goodman & Chick PC

(57) ABSTRACT

Provided is a cell observation apparatus and an observation method with which only an observation target cell in an region of interest is illuminated with illuminating light to prevent photobleaching of cells that are not the observation target. The invention employs a cell observation apparatus including an objective lens that illuminates a specimen with illuminating light, a scanner that adjusts an area illuminated with illuminating light by the objective lens, an image generating portion 31 that generates an image of the specimen illuminated by the objective lens, a cell-data extracting portion 32 that extracts data showing the characteristics of each cell from the generated image of the specimen, a cell-area extracting portion 33 that extracts an area of each cell associated with the extracted data of each cell, a cell-of-interest selecting portion 35 that selects the cell of interest from the specimen in accordance with the extracted data of each cell, and a controller that operates the scanner to illuminate the cell area corresponding to the cell of interest selected by the cell-of-interest selecting portion 35 with the illuminating light.

7 Claims, 19 Drawing Sheets

(56) References Cited

U.S. PATENT DOCUMENTS

2008/0279441 A1* 11/2008 Matsuo et al. ................ 382/133
2010/0278399 A1   11/2010 Bednarkiewicz et al.
2011/0279667 A1   11/2011 Vizi et al.

FOREIGN PATENT DOCUMENTS

| WO | WO 03/105675 A2 | 12/2003 |
| WO | 2007142339 A1 | 12/2007 |
| WO | WO 2009/086521 A2 | 7/2009 |

* cited by examiner

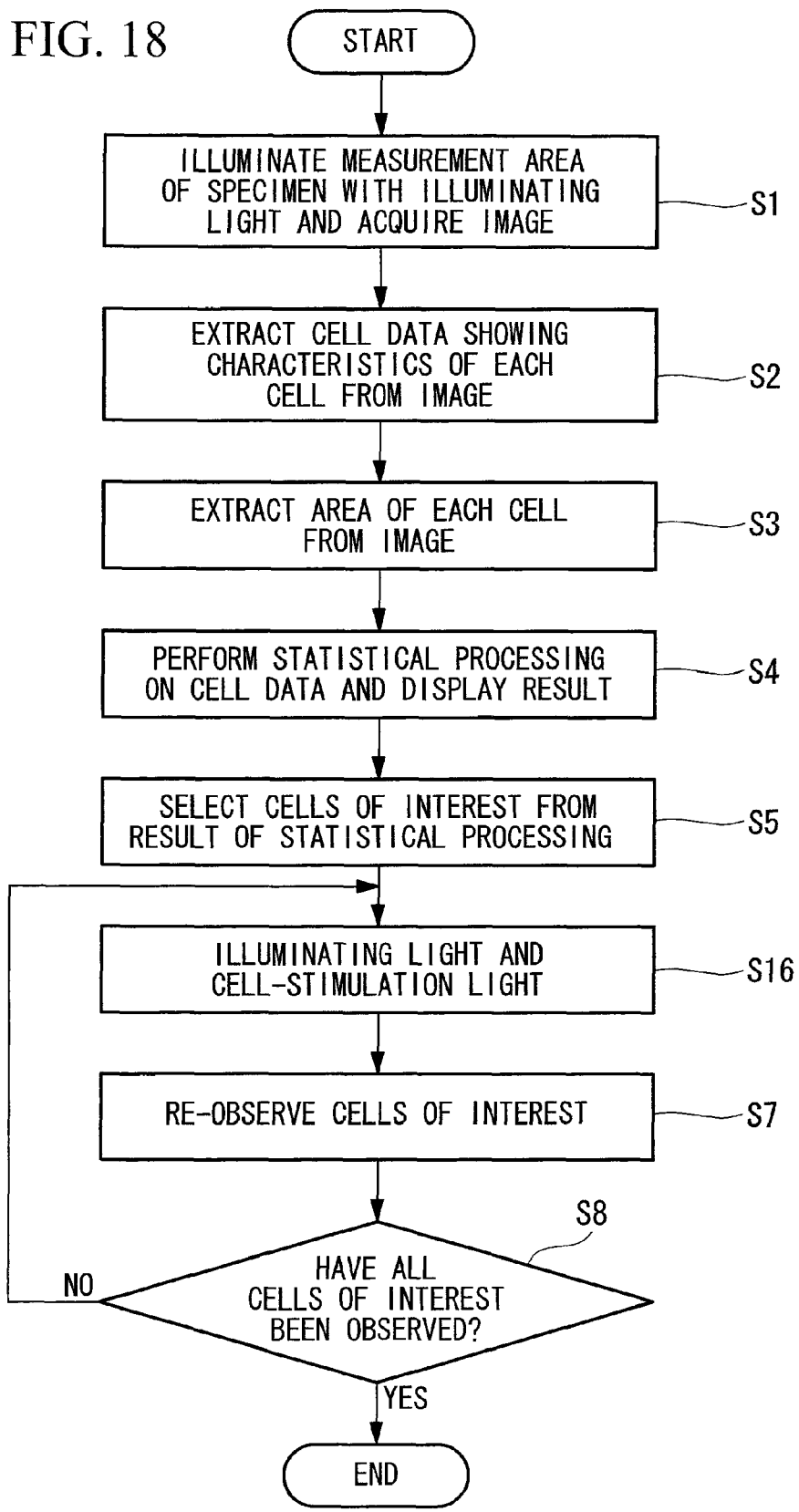

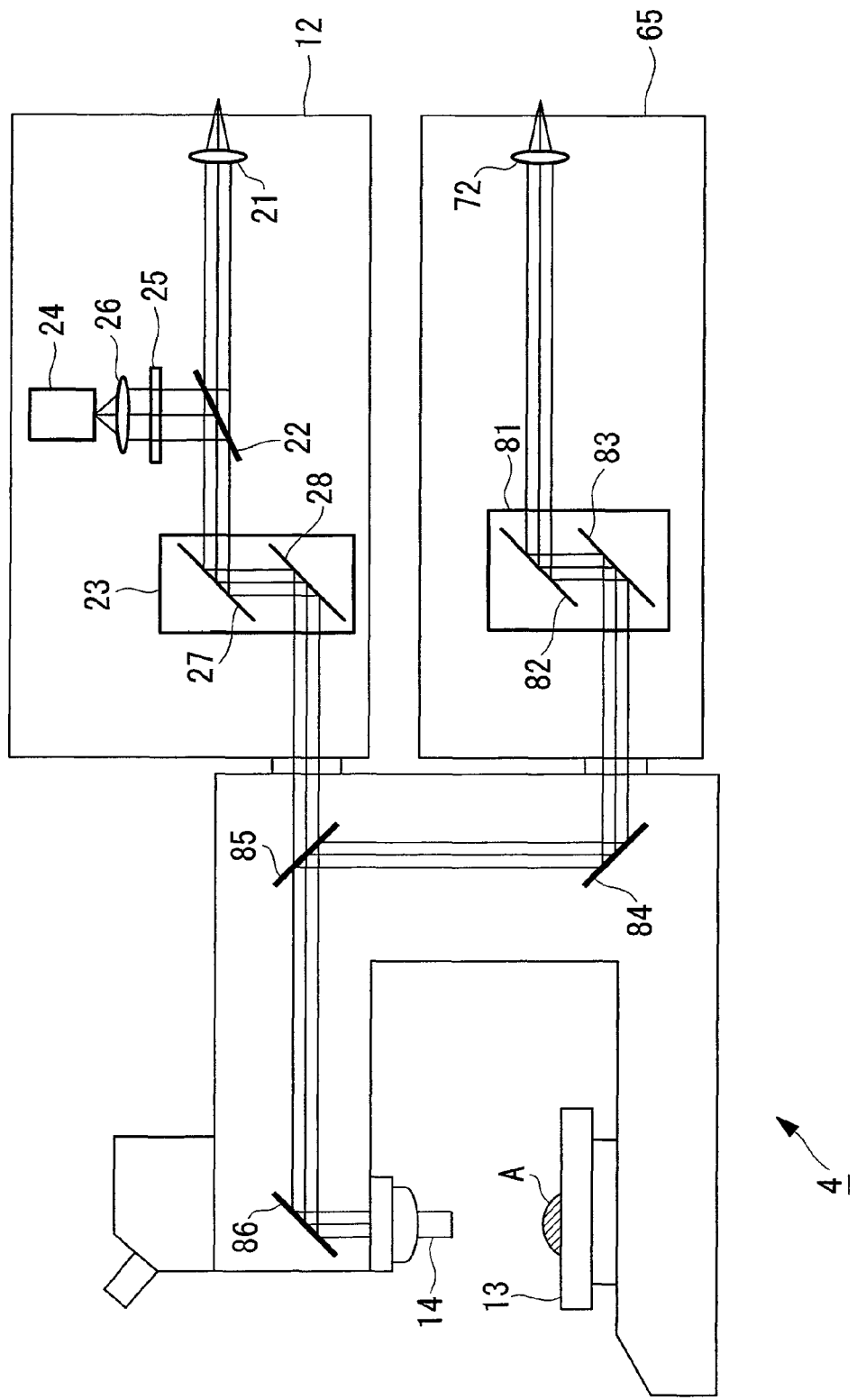

CELL OBSERVATION APPARATUS AND OBSERVATION METHOD

TECHNICAL FIELD

The present invention relates to a cell observation apparatus and an observation method for observing, for example, biological tissue, such as cells.

This application is based on Japanese Patent Application No. 2010-160820, the content of which is incorporated herein by reference.

BACKGROUND ART

There is a known scanning cytometer in which an image acquired by capturing an image of a cell group is divided into a plurality of blocks, and each block where a cell of interest is present is illuminated with a laser beam (for example, see PTL 1).

PTL 1

Japanese Unexamined Patent Application, Publication No. 2000-292422

SUMMARY OF INVENTION

Technical Problem

The present invention provides a cell observation apparatus and an observation method with which only the observation target cell in the region of interest is illuminated with illuminating light to prevent photobleaching of a cell that is not the observation target.

Solution to Problem

A first aspect of the present invention is a cell observation apparatus including: an illumination optical system that illuminates a cell group with illuminating light; an illumination-area adjusting portion that adjusts an illumination area of the illuminating light by using the illumination optical system; an image generating portion that generates an image of the cell group illuminated by the illumination optical system; a cell-data extracting portion that extracts data showing the characteristics of each cell from the image of the cell group generated by the image generating portion; a cell-area extracting portion that extracts an area of each cell associated with the data of each cell extracted by the cell-data extracting portion; a cell-of-interest selecting portion that selects a cell of interest from the cell group in accordance with the data of each cell extracted by the cell-data extracting portion; and a control unit that operates the illumination-area adjusting portion to illuminate the cell area corresponding to the cell of interest selected by the cell-of-interest selecting portion with illuminating light.

According to the first aspect of the present invention, the image generating portion generates an image of a cell group from light emitted from the cell group when the cell group is illuminated with illuminating light by using the illumination optical system. The cell-data extracting portion extracts data showing the characteristics of each cell from this image of the cell group, and the cell-area extracting portion extracts the area of each cell associated with the data of each cell. Furthermore, the cell-of-interest selecting portion selects the cell of interest, which is the observation target, from the cell group in accordance with the data of each cell. Then, the control unit operates the illumination-area adjusting portion to illuminate the cell area corresponding to the cell of interest, which is selected by the cell-of-interest selecting portion, with the illuminating light.

With this configuration, only the cell of interest selected by the cell-of-interest selecting portion is illuminated with the illuminating light, and areas other than the cell of interest are not illuminated with the illuminating light. Thus, cells other than the cell of interest can be prevented from being illuminated with the illuminating light, whereby it is possible to prevent a negative influence due to the illuminating light, such as photobleaching, on the cells other than the cell of interest.

In the above aspect, the illumination-area adjusting portion may be a galvanometer scanner that includes a pair of galvanometer mirrors and a pivot mechanism for pivoting the pair of galvanometer mirrors.

With this configuration, by pivoting the pair of galvanometer mirrors with the pivot mechanism, the illumination area of the illuminating light with the illumination optical system can be adjusted.

In the above aspect, the illumination-area adjusting portion may be a microelement array that includes a plurality of microelements for deflecting the direction of the illuminating light and a driving mechanism for operating the plurality of microelements to change the deflection direction of the illuminating light.

With this configuration, by causing the driving mechanism to operate a plurality of microelements, the deflection direction of the illuminating light can be changed. Thus, part of or the entirety of the illuminating light can be selectively made incident on the illumination optical system, whereby the illumination area of the illuminating light with the illumination optical system can be adjusted.

In the above aspect, the illumination optical system may illuminate the cell of interest with cell-observation illuminating light.

With this configuration, by illuminating the cell of interest with the cell-observation illuminating light with the illumination optical system, an image of the cell of interest can be acquired.

In the above aspect, the illumination optical system may emit cell-stimulation light for stimulating the cell of interest.

With this configuration, it is possible to stimulate the cell of interest by illuminating the cell of interest with the cell-stimulation light with the illumination optical system and then observe the cell of interest that has changed state by being stimulated.

In the above aspect, the illumination-area adjusting portion may correct the size of the area illuminated with the illuminating light depending on the magnification of the illumination optical system.

With this configuration, the size of the area illuminated with the illuminating light can be corrected depending on the magnification of the illumination optical system, and the illumination-area adjusting portion can illuminate an appropriate illumination area with the illuminating light. Thus, it is possible to effectively prevent photobleaching caused by cells other than the cell of interest being illuminated with the illuminating light.

A second aspect of the present invention is a cell observation method including: an image acquisition step of illuminating a cell group with illuminating light and acquiring an image of the cell group; a cell-data extraction step of extracting data of each cell from the image of the cell group acquired in the image acquisition step; a cell-area extraction step of extracting an area of each cell associated with the data of each cell extracted in the cell-data extraction step; a cell-of-interest selecting step of selecting a cell of interest from the cell group in accordance with the data of each cell extracted in the cell-area extraction step; a cell-of-interest illuminating step of illuminating the cell area corresponding to the cell of interest selected in the cell-of-interest selecting step with the illuminating light; and a cell-of-interest displaying step of displaying an image of the cell of interest illuminated with the illuminating light in the cell-of-interest illuminating step.

According to the second aspect of the present invention, the cell of interest, which is the observation target, is selected from the cell group in accordance with the data of each cell extracted from the image of the cell group, and the cell area corresponding to this cell of interest is illuminated with the illuminating light. With this configuration, only the cell of interest is illuminated with the illuminating light, and areas other than the cell of interest are not illuminated with the illuminating light. Thus, cells other than the cell of interest can be prevented from being illuminated with the illuminating light, whereby it is possible to prevent a negative influence due to the illuminating light, such as photobleaching, on the cells other than the cell of interest.

Advantageous Effects of Invention

The present invention provides an advantage in that photobleaching of cells that are not the observation target can be prevented by illuminating only the observation target cell in the region of interest with illuminating light.

BRIEF DESCRIPTION OF DRAWINGS

FIG. 18 is a flowchart showing processing executed when a cell is observed and stimulated with the microscope in FIG. 15.

FIG. 19 is a schematic diagram of the configuration of a microscope according to a modification of FIG. 15.

DESCRIPTION OF EMBODIMENTS

{First Embodiment}

A microscope 1 according to a first embodiment of the present invention will be described below with reference to the drawings.

Figure 1:
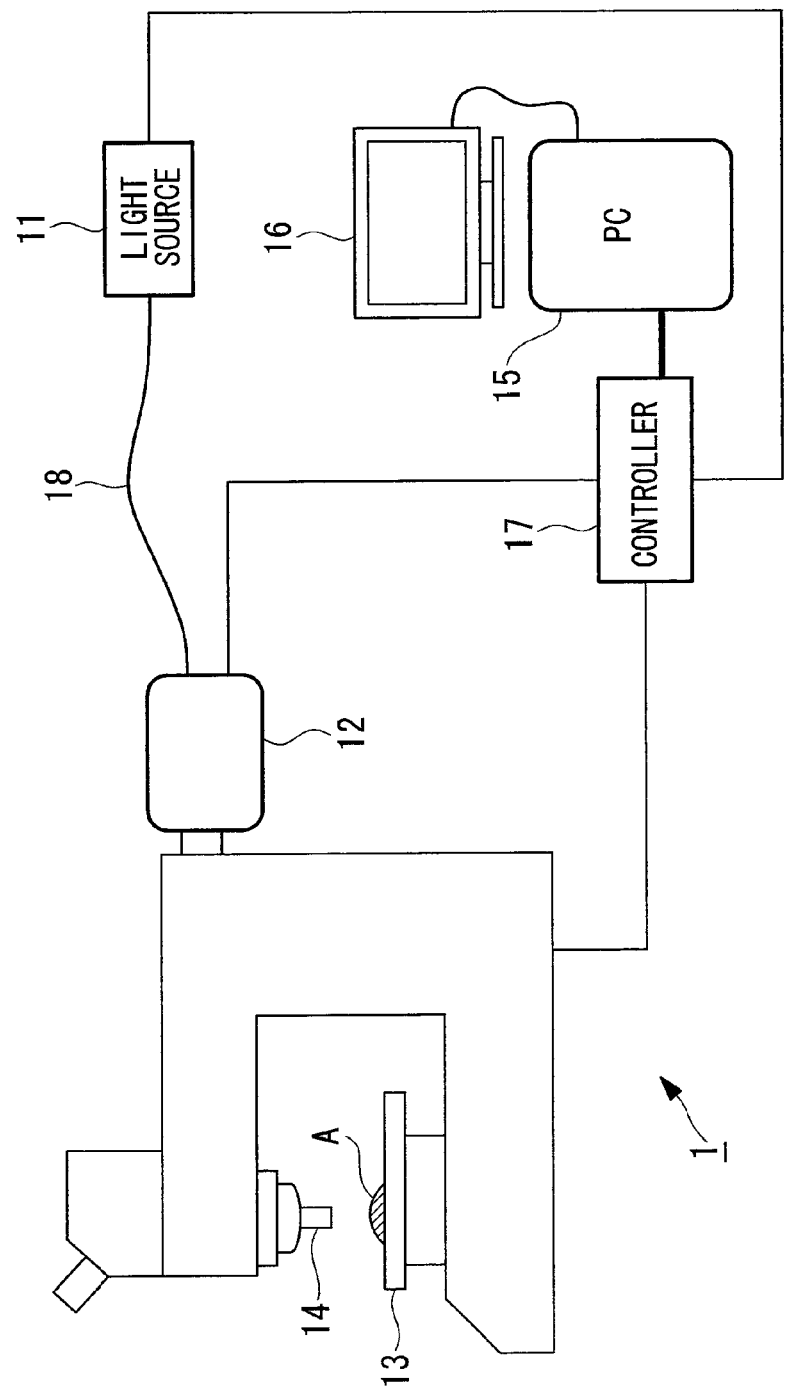
FIG. 1 is a schematic diagram of the configuration of a microscope according to a first embodiment of the present invention.

As shown in FIG. 1, the microscope 1 according to this embodiment includes a light source 11 that emits illuminating light, a stage 13 on which a specimen A is placed, an objective lens (illumination optical system) 14 disposed so as to face the specimen A, an optical unit 12 that detects light from the specimen A, collected by the objective lens 14, a PC 15 that generates an image from the light from the specimen A, detected by the optical unit 12, a monitor 16 that displays the image generated by the PC 15, and a controller (control unit) 17 that controls these components.

The light source 11 is a light source that emits cell-observation illuminating light, which is light for observing, for example, the specimen A consisting of a group of cells. More specifically, the light source 11 emits, for example, excitation light for exciting a fluorescent substance preferentially deposited on or appearing in the observation target in the specimen A.

The objective lens 14 illuminates the specimen A with illuminating light emitted from the light source 11 and collects the light from the specimen A. More specifically, for example, the objective lens 14 illuminates the specimen A with excitation light emitted from the light source 11 and collects fluorescence produced by an excited fluorescent substance in the specimen A.

The light source 11 and the optical unit 12 are connected by an optical fiber 18, and the illuminating light emitted from the light source 11 is guided to the optical unit 12 by the optical fiber 18.

Figure 2:
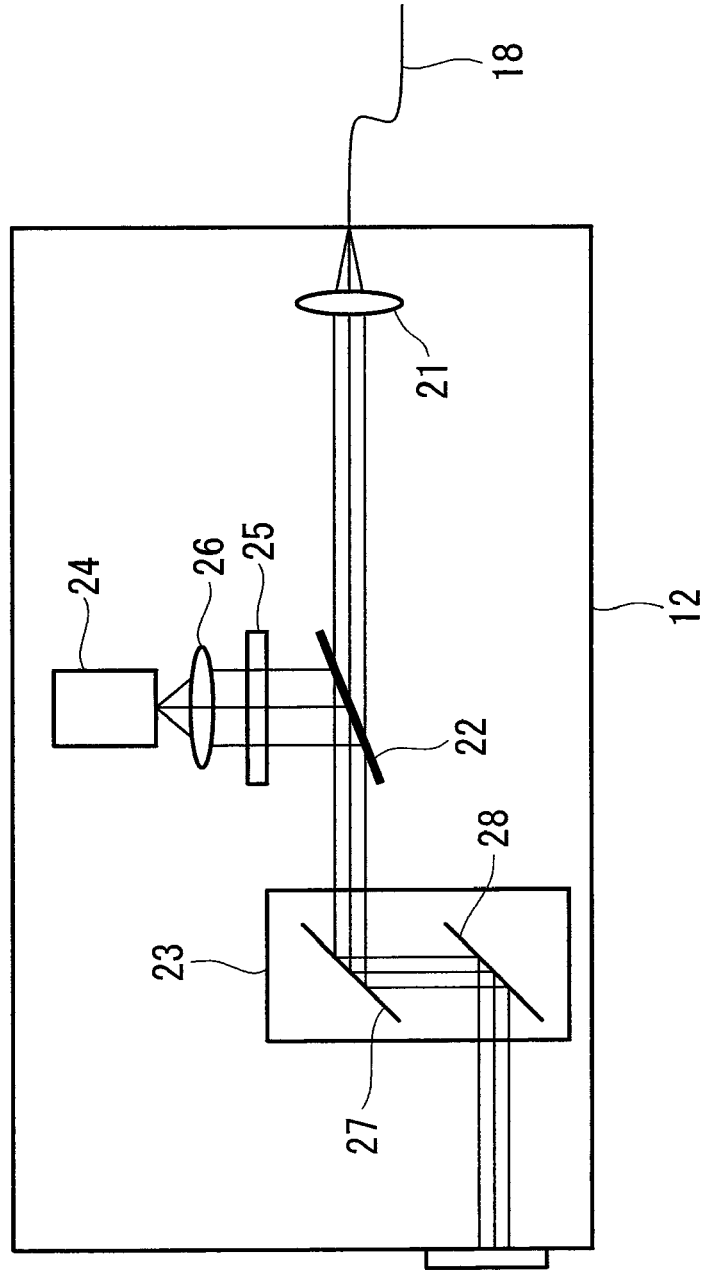
FIG. 2 is a partial enlarged view of an optical unit in FIG. 1.

As shown in FIG. 2, the optical unit 12 includes a lens 21 that converts the illuminating light guided by the optical fiber 18 into collimated light, a dichroic mirror 22 disposed in the optical path of the illuminating light, a scanner (illumination-area adjusting portion) 23 that scans the illuminating light from the light source 11, and a photodetector 24 that detects light from the specimen A.

The dichroic mirror 22 allows the illuminating light from the light source 11 to pass therethrough while reflecting the light from the specimen A, collected by the objective lens 14, toward the photodetector 24. Thus, the dichroic mirror 22 separates the illuminating light emitted from the light source 11 from the light emitted from the specimen A.

The photodetector 24 is, for example, a photomultiplier tube that outputs to the controller 17 an electric signal resulting from photoelectric conversion of the detected light from the specimen A.

A barrier filter 25 that blocks the illuminating light from the light source 11 among the light from the specimen A reflected by the dichroic mirror 22, and a lens 26 that focuses the light from the specimen A having passed through the barrier filter 25 onto a light-receiving surface of the photodetector 24 are provided between the dichroic mirror 22 and the photodetector 24.

The scanner 23 includes a pair of, for example, silver-coated galvanometer mirrors 27 and 28 and is driven by a raster-scan method by changing the pivot angle of these galvanometer mirrors 27 and 28. Thus, the illuminating light from the light source 11 can be scanned over the specimen A in two dimensions.

Figure 3:
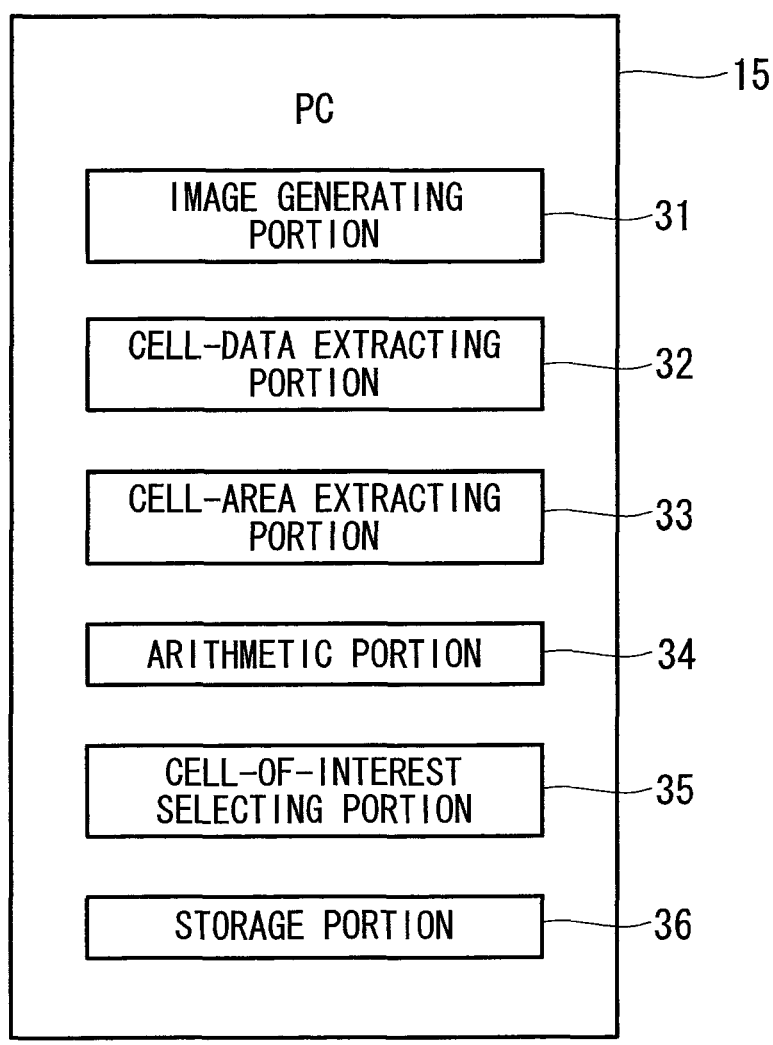
FIG. 3 is a functional block diagram showing, in an expanded manner, the function of a PC in FIG. 1.

As shown in FIG. 3, the PC 15 is a personal computer having functions of an image generating portion 31 that generates an image of the specimen A, a cell-data extracting portion 32 that extracts data of each cell, a cell-area extracting portion 33 that extracts an area of each cell associated with the data of each cell, an arithmetic portion 34 that performs arithmetic processing of the data of each cell, a cell-of-interest selecting portion 35 that selects the cell of interest in the specimen A in accordance with the data of each cell, and a storage portion 36 that stores the extracted data.

The image generating portion 31 generates an image of the specimen A from the illumination area of the illuminating light on the specimen A, which is moved by the scanner 23, and the intensity of light detected by the photodetector 24.

Figure 4:
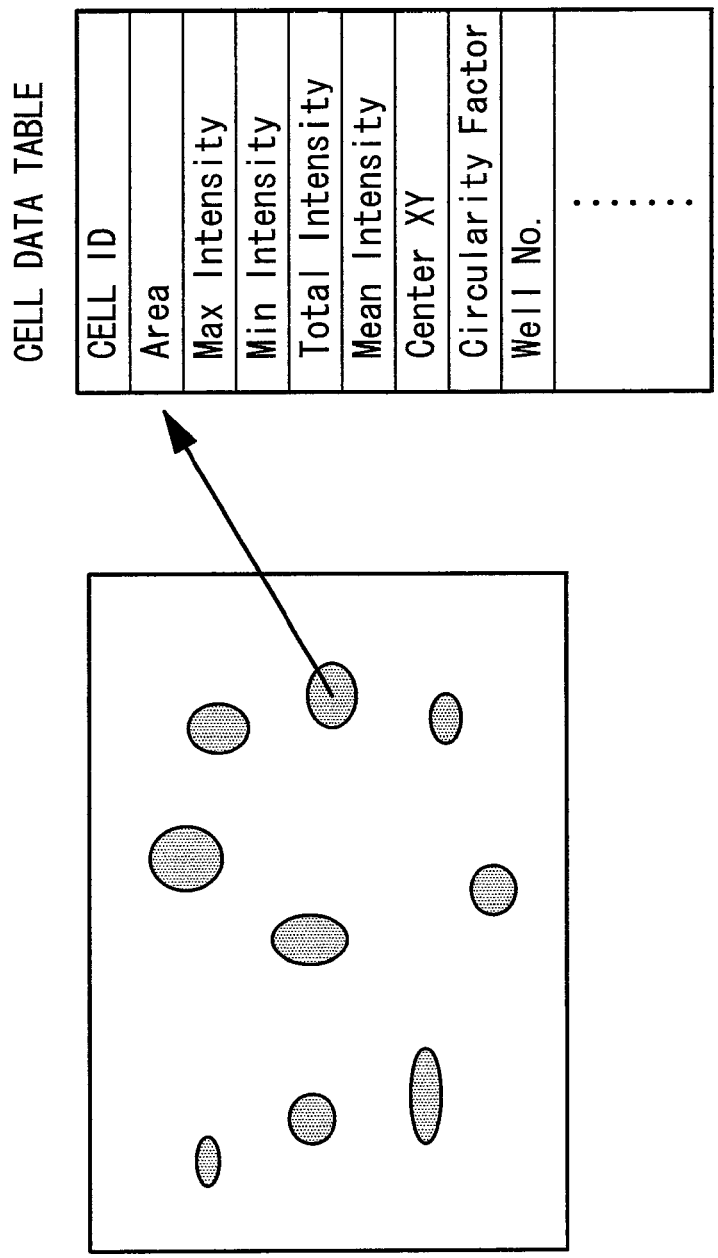
FIG. 4 is a diagram showing exemplary cell data extracted by a cell-data extracting portion in FIG. 3.

The cell-data extracting portion 32 extracts data showing the characteristics of each cell from the image of the specimen A generated by the image generating portion 31. Herein, the "data of each cell" includes, as shown in FIG. 4, for example, the area (Area), maximum intensity (Max Intensity), minimum intensity (Min Intensity), circularity (Circularity Factor), and the like of each cell. These data are stored in the storage portion 36 as a cell data table associated with each cell.

Figure 5:
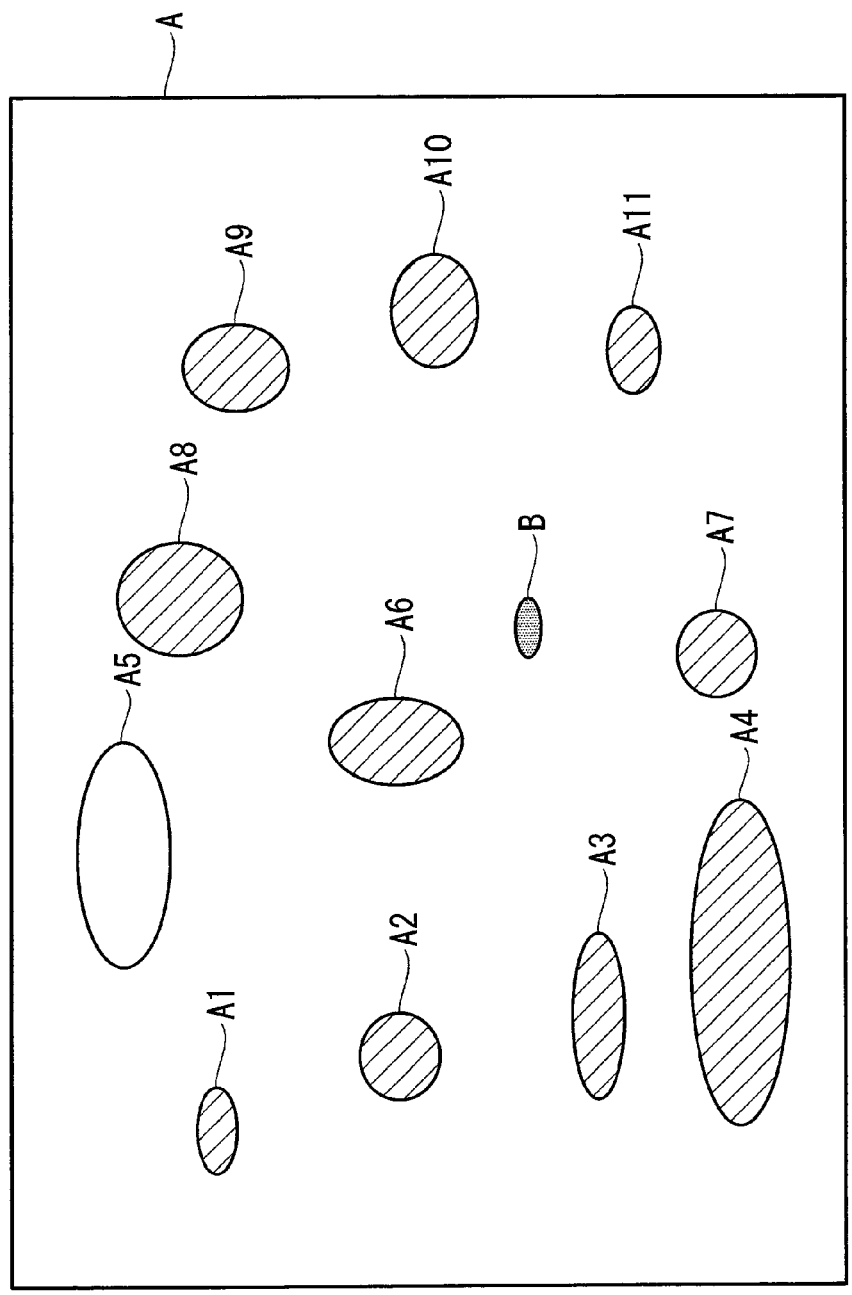
FIG. 5 is a diagram showing an image of a specimen generated by an image generating portion in FIG. 3.
Figure 6:
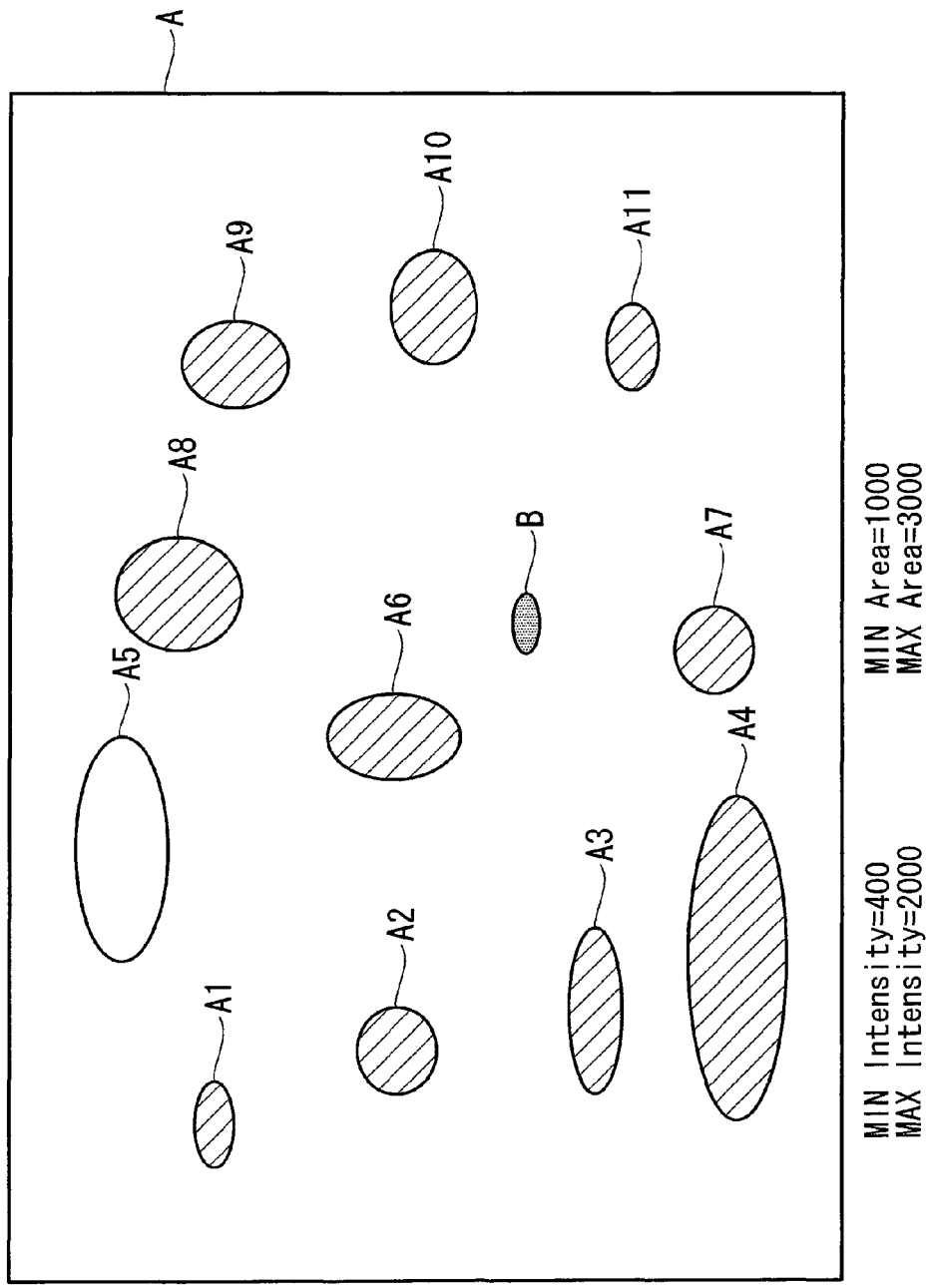
FIG. 6 is a diagram showing exemplary conditions for extracting cell areas from the image of the specimen in FIG. 5.
Figure 7:
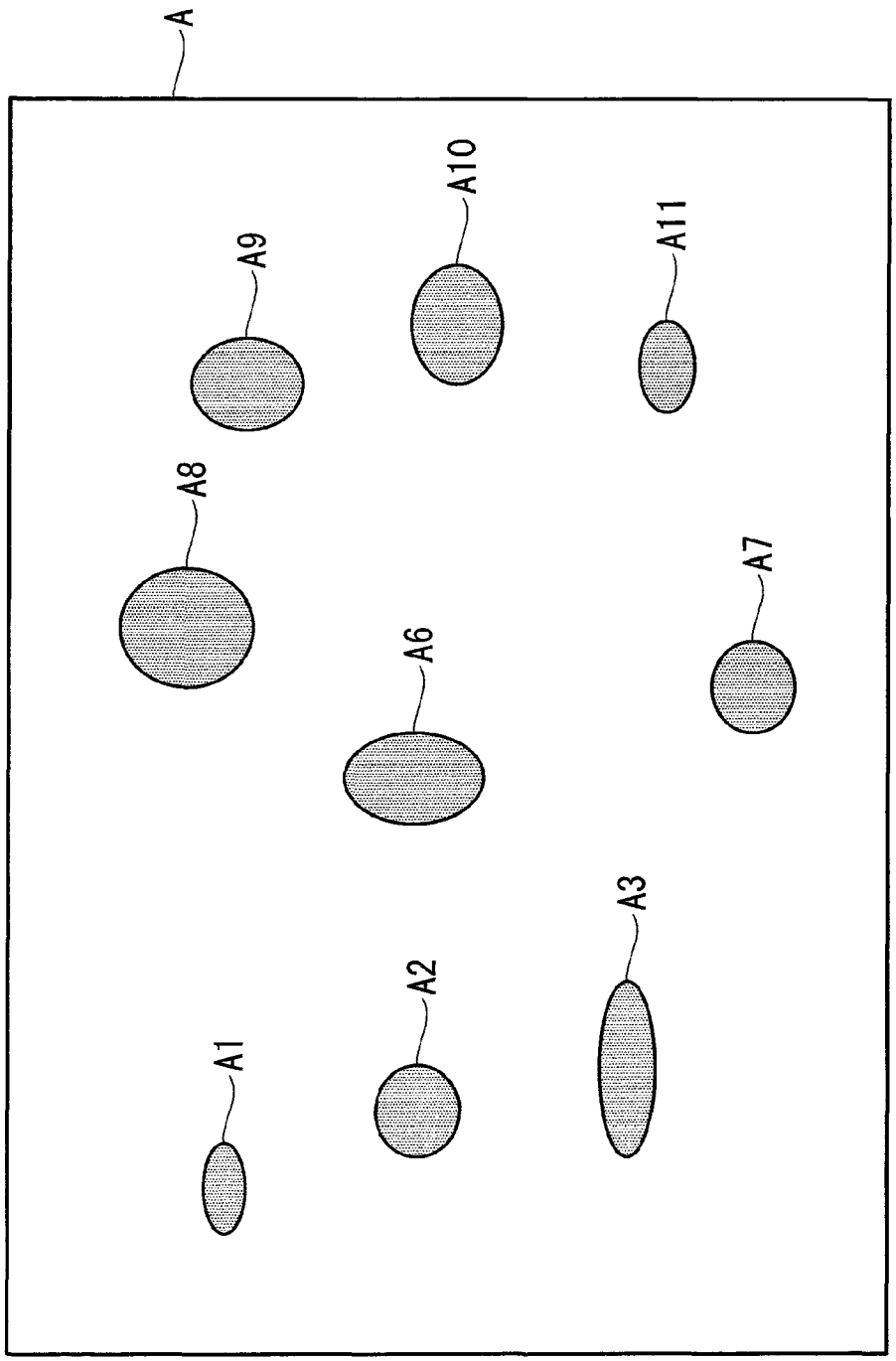
FIG. 7 is a diagram showing cell areas extracted by a cell-area extracting portion in FIG. 3.

The cell-area extracting portion 33 extracts the area of each cell associated with the data of each cell extracted by the cell-data extracting portion 32 from the image of the specimen A generated by the image generating portion 31. More specifically, as shown in FIG. 5, when foreign matter B, such as dust, is present among cells A1 to A11 in the image of the specimen A generated by the image generating portion 31, cell areas are extracted by setting various conditions, as shown in FIG. 6. FIG. 6 shows, as an example, the maximum intensity (Max Intensity), the minimum intensity (Min Intensity), the maximum area (Max Area), and the minimum area (Min Area) set as the conditions for extracting cell areas. By setting these conditions, cell areas, which are denoted by reference numerals A1 to A3 and A6 to A11, are extracted, as shown in FIG. 7.

Figure 8:
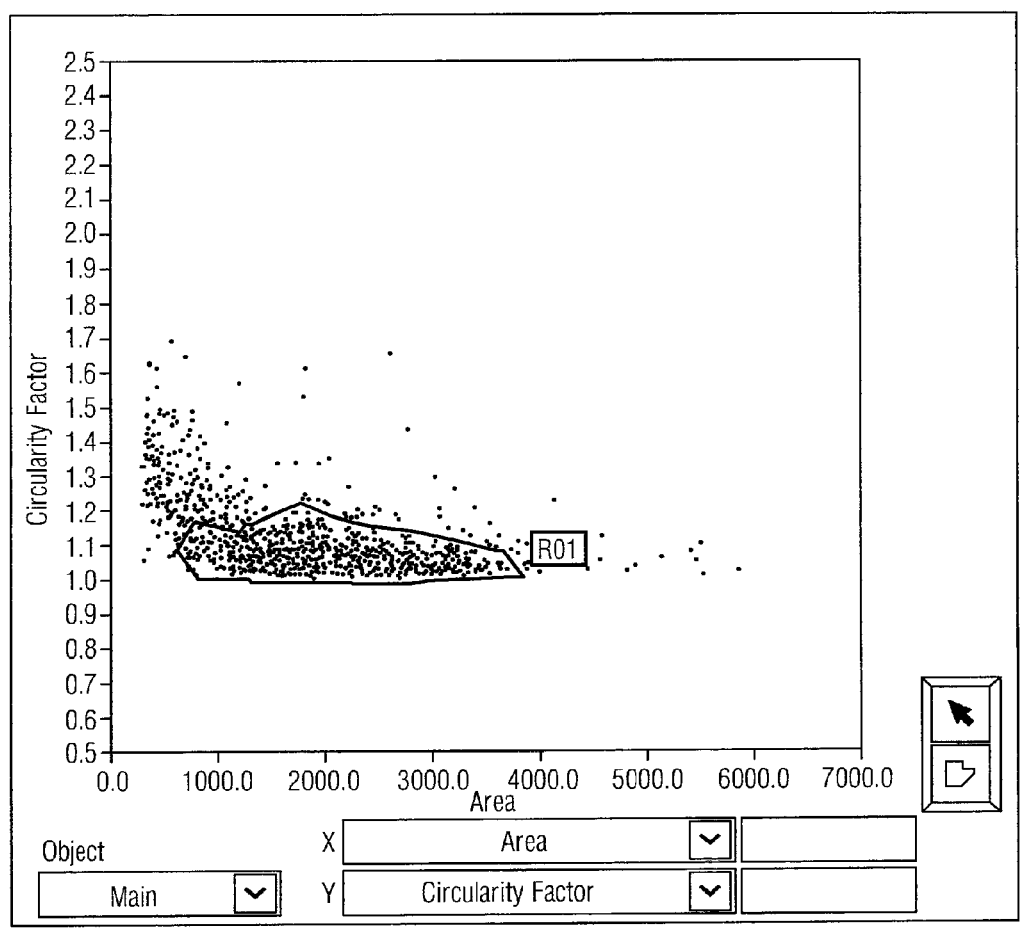
FIG. 8 is a diagram showing a scattergram generated by an arithmetic portion in FIG. 3.
Figure 9:
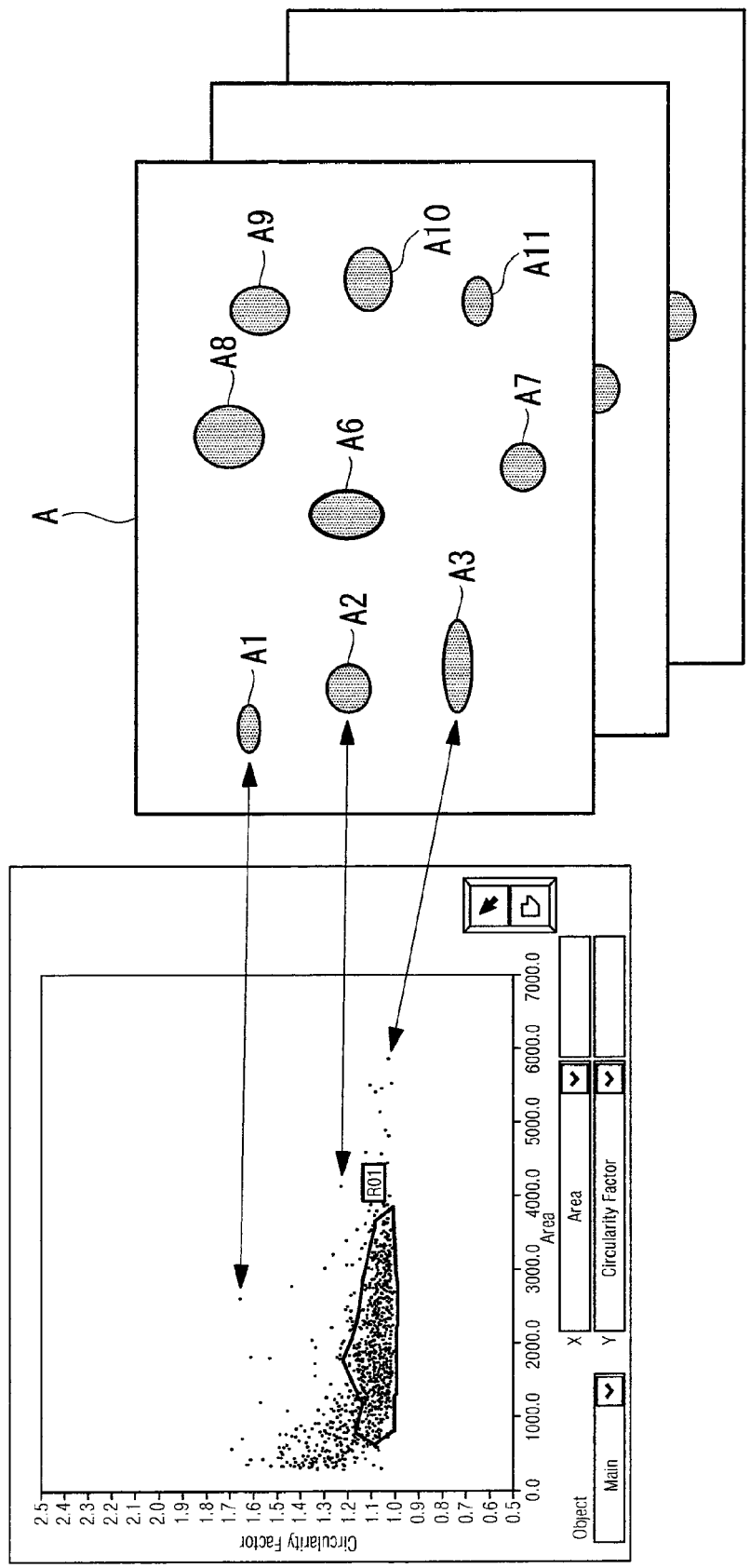
FIG. 9 is a diagram for describing the relationship between dots and cell areas in the scattergram in FIG. 8.

The arithmetic portion 34 performs statistical processing on the data of each cell extracted by the cell-data extracting portion 32 and displays the processing results on the monitor 16. More specifically, the arithmetic portion 34 displays the data of each cell extracted by the cell-data extracting portion 32 on a scattergram, as shown in FIG. 8. FIG. 8 shows, as an example, a scattergram in which the circularity (Circularity Factor) of each cell is plotted on the vertical axis, and the area (Area) of each cell is plotted on the horizontal axis. As shown in FIG. 9, the data (dots) on the scattergram are associated with the cell areas A1 to A3 and A6 to A11 extracted by the cell-area extracting portion 33.

Figure 10:
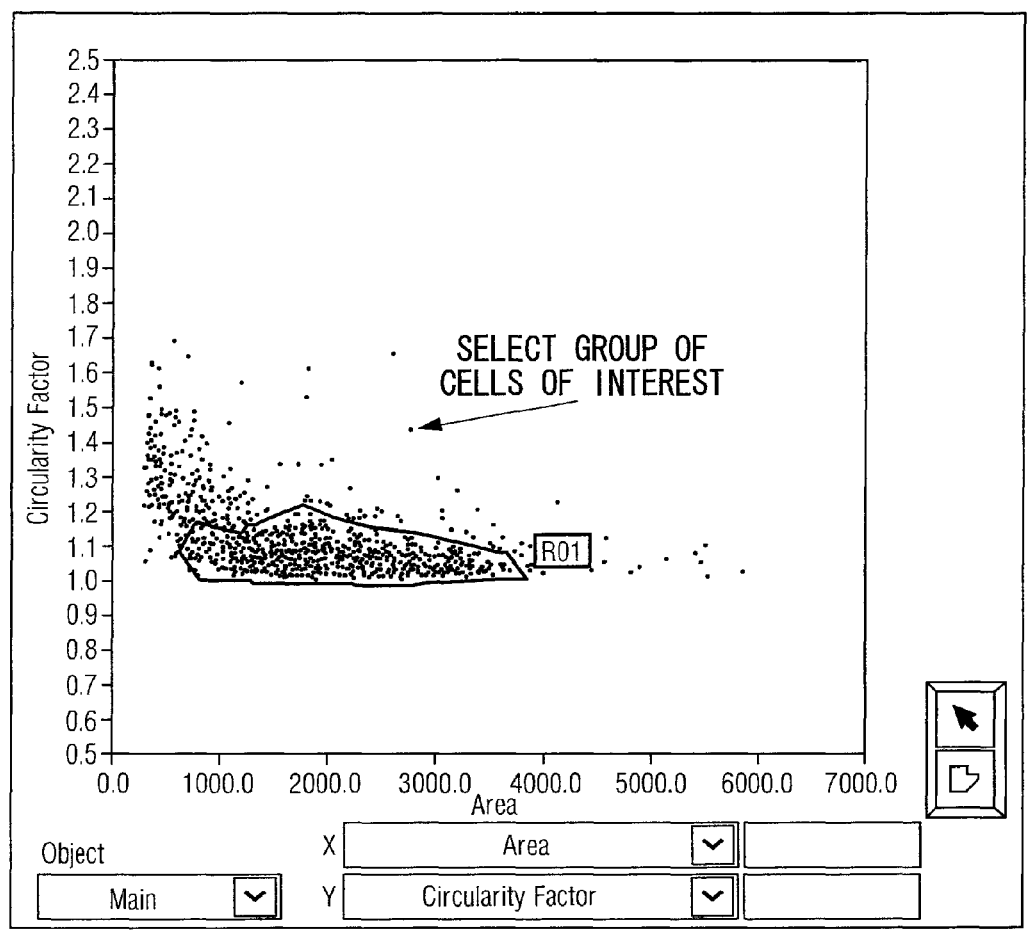
FIG. 10 is a diagram showing a group of cells of interest selected by an region of interest selecting portion in FIG. 3.

The cell-of-interest selecting portion 35 selects the cell of interest in the specimen A in accordance with the data of each cell extracted by the cell-data extracting portion 32. More specifically, as shown in FIG. 10, the cell-of-interest selecting portion 35 selects a group of cells of interest from the scattergram displayed on the monitor 16 after the scattergram is arithmetically processed by the arithmetic portion 34, based on a user operating an input device (not shown), such as a mouse.

The controller 17 illuminates the cell areas corresponding to the cells of interest selected by the cell-of-interest selecting portion 35 with the illuminating light by operating the scanner 23. More specifically, the controller 17 illuminates the area corresponding to each cell of interest in the group of cells of interest on the scattergram shown in FIG. 10 with the illuminating light.

The operation of the microscope 1 having the above-described configuration will be described below.

When the light source 11 is activated, illuminating light emitted from the light source 11 is guided to the optical unit 12. The illuminating light guided to the optical unit 12 passes through the dichroic mirror 22, is scanned over the specimen A in two dimensions by the scanner 23, and is made incident on the specimen A by the objective lens 14.

The light from the specimen A (for example, reflected light or fluorescence) is collected by the objective lens 14, passes through the scanner 23, and is reflected by the dichroic mirror 22. The reflected light from the specimen A passes through the barrier filter 25 and the lens 26 and is detected by the photodetector 24.

By storing the information about the intensity of light from the specimen A detected by the photodetector 24 and the illumination position of the illuminating light by the scanner 23 in association with each other, a two-dimensional image can be generated.

A cell observation method by using the microscope 1, using the image of the specimen A generated in this way, will be described below according to a flowchart shown in FIG. 11.

First, in an image acquisition step S1, a measurement area of the specimen A is illuminated with illuminating light to acquire an image of the specimen A.

Next, in a cell-data extraction step S2, data showing the characteristics (area, intensity, etc.,) of each cell is extracted from the image of the specimen A acquired in the image acquisition step S1.

Next, in a cell-area extraction step S3, the area of each cell associated with the data of each cell extracted in the cell-data extraction step S2 is extracted.

Next, in a statistical processing step S4, statistical processing is performed on the data of each cell extracted in the cell-data extraction step S2 to generate a scattergram.

Next, in a cell-of-interest selecting step S5, cells of interest are selected from the specimen A using the result obtained by the statistical processing in the statistical processing step S4, that is, the scattergram.

Next, in a cell-of-interest illuminating step S6, the cell areas corresponding to the cells of interest selected in the cell-of-interest selecting step S5 are sequentially illuminated with the illuminating light.

Next, in a cell-of-interest displaying step S7, images of the cells of interest illuminated with the illuminating light in the cell-of-interest illuminating step are displayed (re-observation).

Next, determination is performed as to whether or not all the cells of interest have been subjected to the above-described processing of the cell-of-interest illuminating step S6 and cell-of-interest displaying step S7 (step S8). If there is any unobserved cell of interest, the processing of the cell-of-interest illuminating step S6 and cell-of-interest displaying step S7 is repeated. When all the cells of interest have been subjected to the above-described processing, cell observation ends.

Figure 12:
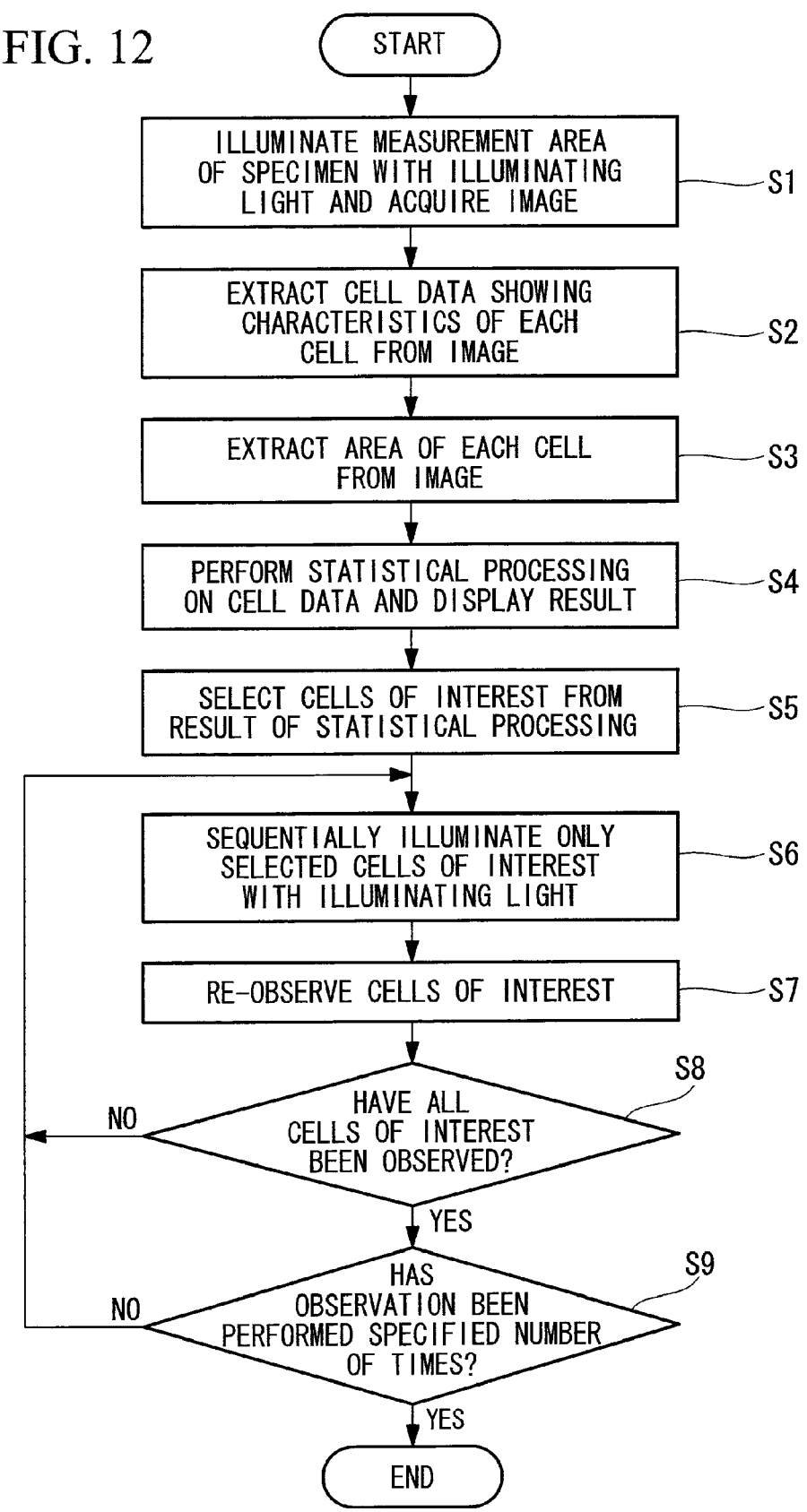
FIG. 12 is a flowchart showing processing executed when time-lapse observation is performed by the microscope in FIG. 1.

Furthermore, when time-lapse observation is performed using the microscope 1 having the above-described configuration, as shown in FIG. 12, determination is performed as to whether or not observation has been performed the number of times preliminarily specified for the time-lapse observation (specified number of times) (step S9), in addition to the processing of steps S1 to S8. When the observation has been performed less than the specified number of times, the processing of steps S6 to S8 is repeated, and when the observation has been performed the specified number of times, the time-lapse observation ends.

In this manner, with the microscope 1 according to this embodiment, the cells of interest, which are the observation target, are selected from the specimen A in accordance with the data of each cell extracted from the image of the specimen A, and the cell areas corresponding to these cells of interest are illuminated with the illuminating light. With this configuration, only the cells of interest are illuminated with the illuminating light, and areas other than the cells of interest are not illuminated with the illuminating light. Thus, cells other than the cells of interest can be prevented from being illuminated with the illuminating light, whereby it is possible to prevent a negative influence due to the illuminating light, such as photobleaching, on the cells other than the cells of interest.

Furthermore, in the microscope 1 according to this embodiment, a correcting portion that automatically corrects the size of the area illuminated with the illuminating light depending on the magnification of the objective lens 14 may be provided in the optical unit 12.

With this configuration, the size of the area illuminated with the illuminating light can be automatically corrected depending on the magnification of the objective lens 14, whereby an appropriate illumination area can be illuminated with the illuminating light. Thus, it is possible to effectively prevent photobleaching caused by cells other than the cell of interest being illuminated with the illuminating light.

{Second Embodiment}

A microscope 2 according to a second embodiment will be described below with reference to the drawings. In the following description, the microscope 2 according to this embodiment will be described focusing on the differences in structure from the microscope 1 according to the first embodiment, while a description about the commonalities with the microscope 1 will be omitted.

Figure 13:
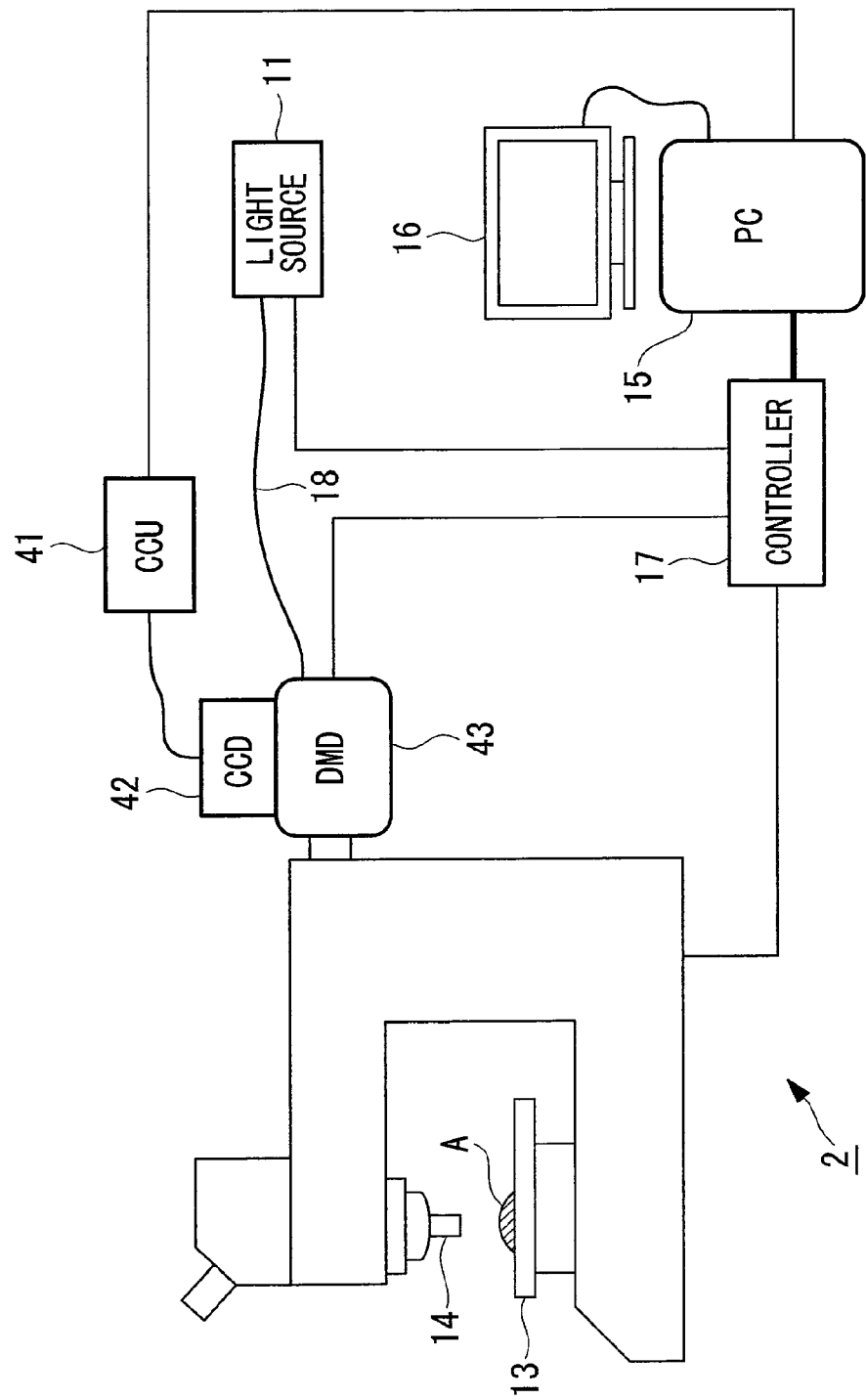
FIG. 13 is a schematic diagram of the configuration of a microscope according to a second embodiment of the present invention.

As shown in FIG. 13, the microscope 2 according to this embodiment includes the light source 11 that emits illuminating light, a DMD unit 43 that adjusts the area on the specimen A illuminated with the illuminating light from the light source 11, the stage 13 on which the specimen A is placed, the objective lens (illumination optical system) 14 disposed so as to face the specimen A, a CCD unit 42 that detects light from the specimen A, collected by the objective lens 14, the PC 15 that generates an image from the light from the specimen A, detected by the CCD unit 42, a communication unit (CCU) 41 disposed between the CCD unit 42 and the PC 15, the monitor 16 that displays the image generated by the PC 15, and the controller (control unit) 17 that controls these components.

Figure 14:
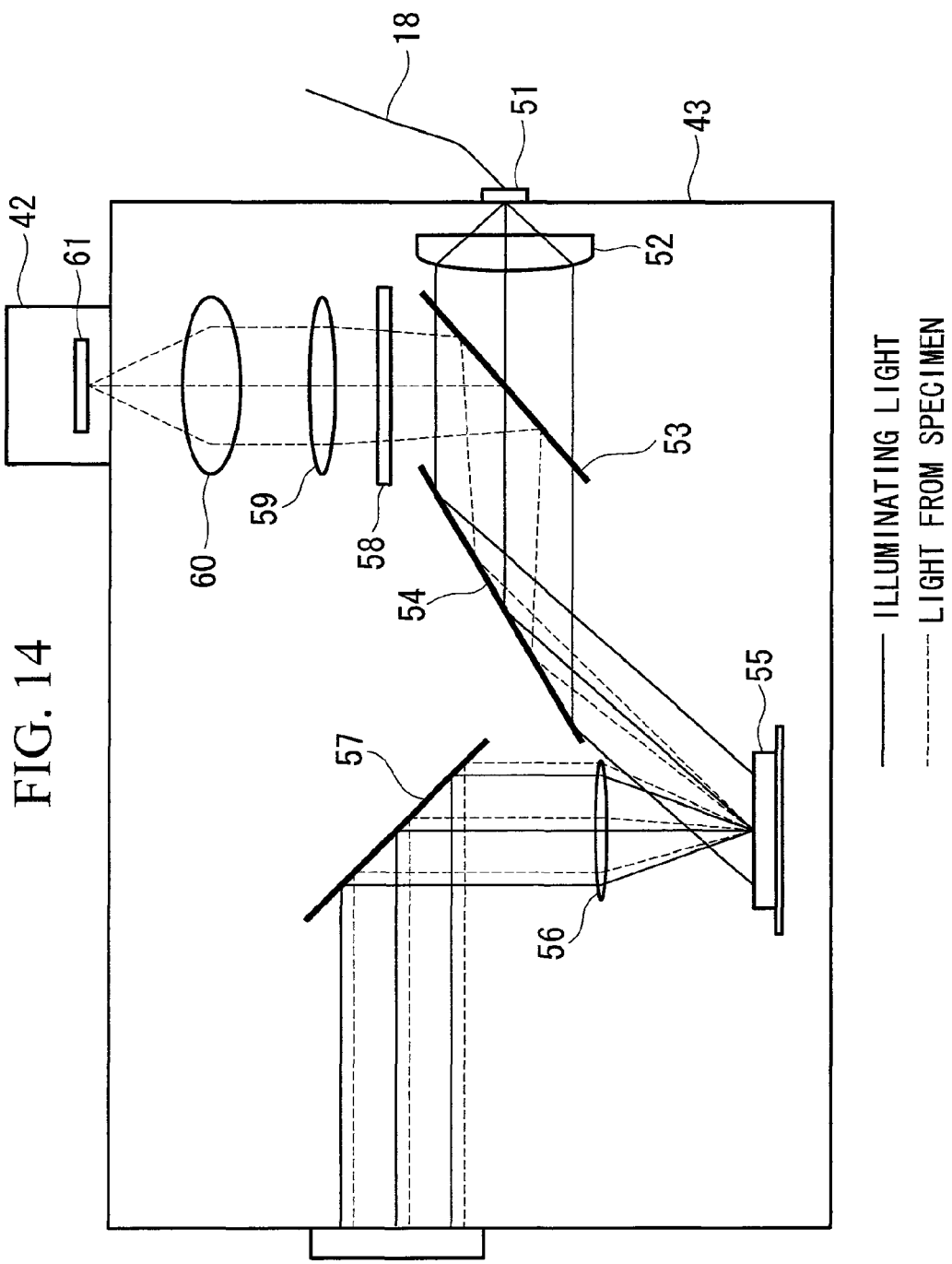
FIG. 14 is a partial enlarged view of a DMD unit in FIG. 13.

As shown in FIG. 14, the DMD unit 43 includes a fiber attachment 51 to which the optical fiber 18 is connected, a cylindrical lens 52 that converts the illuminating light guided by the optical fiber 18 into collimated light, a dichroic mirror 53 disposed in the optical path of the illuminating light, a mirror 54 that reflects the illuminating light having passed through the dichroic mirror 53 toward a DMD 55, the DMD (illumination-area adjusting portion) 55 in which a plurality of micro-movable mirrors are arrayed, an image-forming lens 56 that forms an image of the light from the specimen A onto the DMD 55, and a mirror 57 that reflects the light from the specimen A toward the DMD 55.

The DMD (Digital Micromirror Device) 55 has a configuration in which a plurality of micro-movable mirrors (microelements) are arrayed. By operating (turning ON/OFF) the micro-movable mirrors, part of or the entirety of the illuminating light emitted from the light source 11 is selectively reflected to change the illumination area of the illuminating light on the specimen A.

The dichroic mirror 53 allows the illuminating light from the light source 11 to pass therethrough while reflecting the light from the specimen A, collected by the objective lens 14, toward the CCD unit 42. Thus, the dichroic mirror 53 separates the illuminating light emitted from the light source 11 from the light emitted from the specimen A.

The CCD unit 42 includes a CCD (Charge Coupled Device) 61 that detects light from the specimen A to generate an image of the specimen A. The CCD unit 42 outputs an image signal of the specimen A to the PC 15 via a CCU 41.

A barrier filter 58 that blocks the illuminating light from the light source 11 among the light from the specimen A reflected by the dichroic mirror 53, and lenses 59 and 60 that focus the light from the specimen A having passed through the barrier filter 58 onto the light-receiving surface of a CCD 61 are provided between the dichroic mirror 53 and the CCD 61.

In the microscope 2 according to this embodiment having the above-described configuration, the cell areas corresponding to the cells of interest are illuminated with illuminating light by operating (turning ON/OFF) the micro-movable mirrors of the DMD 55. With this configuration, only the cells of interest are illuminated with the illuminating light, and areas other than the cells of interest are not illuminated with the illuminating light. Thus, similarly to the above-described first embodiment, cells other than the cells of interest can be prevented from being illuminated with the illuminating light, whereby it is possible to prevent a negative influence due to the illuminating light, such as photobleaching, on the cells other than the cells of interest.

{Third Embodiment}

A microscope 3 according to a third embodiment will be described below with reference to the drawings. In the following description, the microscope 3 according to this embodiment will be described focusing on the differences in structure from the microscopes 1 and 2 according to the above-described embodiments, while a description about the commonalities with the microscopes 1 and 2 will be omitted.

Figure 15:
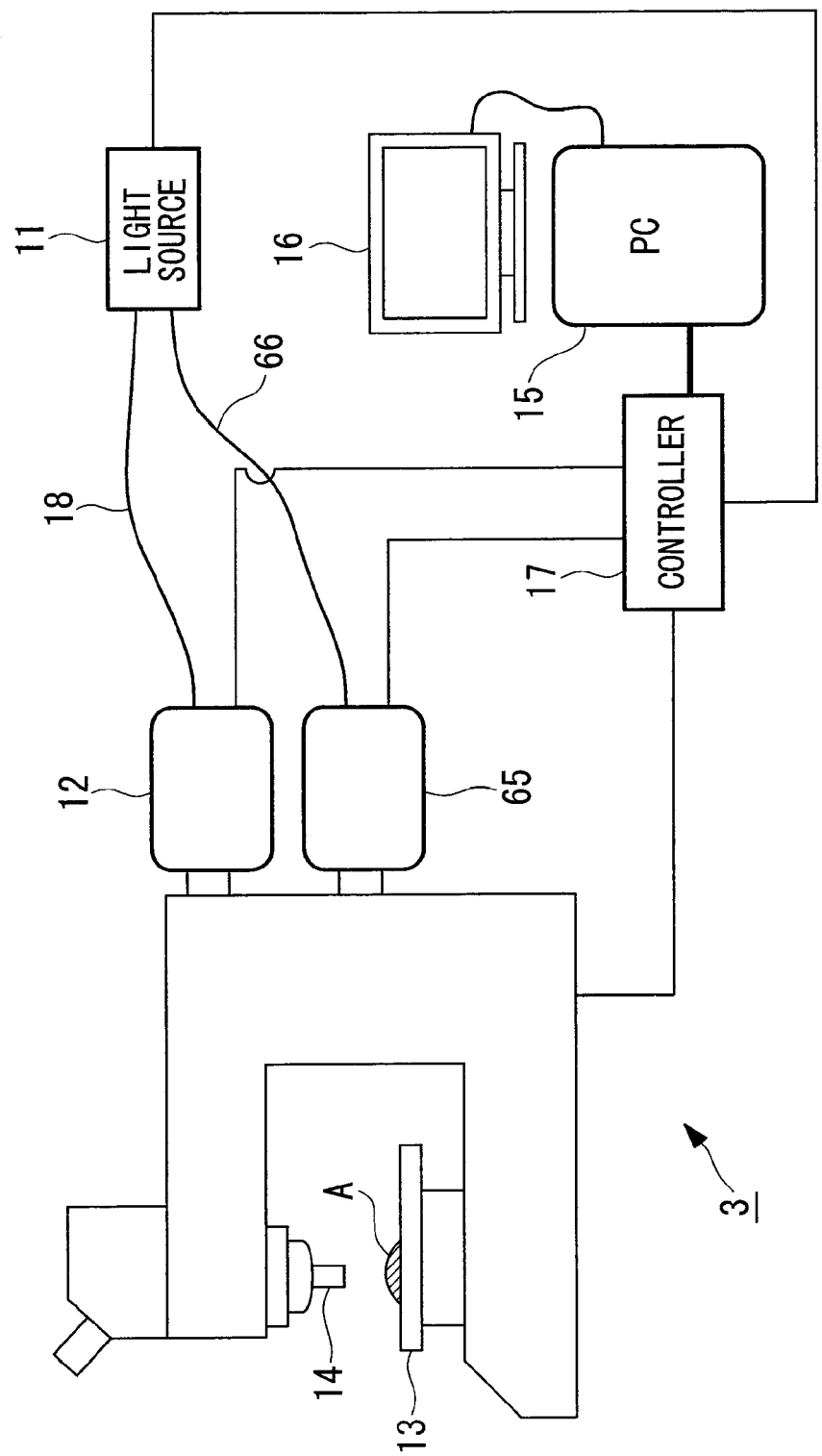
FIG. 15 is a schematic diagram of the configuration of a microscope according to a third embodiment of the present invention.

As shown in FIG. 15, the microscope 3 according to this embodiment includes the light source 11 that emits illuminating light, the stage 13 on which the specimen A is placed, the objective lens (illumination optical system) 14 disposed so as to face the specimen A, the optical unit 12 that detects light from the specimen A, collected by the objective lens 14, a stimulation-position adjusting unit 65 that adjusts the illumination position of stimulation light with which the specimen A is stimulated, the PC 15 that generates an image from the light from the specimen A, detected by the optical unit 12, the monitor 16 that displays the image generated by the PC 15, and the controller (control unit) 17 that controls these components.

The light source 11 is a light source that simultaneously, or in a switching manner, emits cell-observation illuminating light for observing the specimen A composed of, for example, a group of cells and cell-stimulation light for stimulating cells.

The light source 11 and the optical unit 12 are connected by the optical fiber 18, and the illuminating light emitted from the light source 11 is guided to the optical unit 12 by the optical fiber 18.

The light source 11 and the stimulation-position adjusting unit 65 are connected by an optical fiber 66, and cell-stimulation light emitted from the light source 11 is guided to the stimulation-position adjusting unit 65 by the optical fiber 66.

Figure 16:
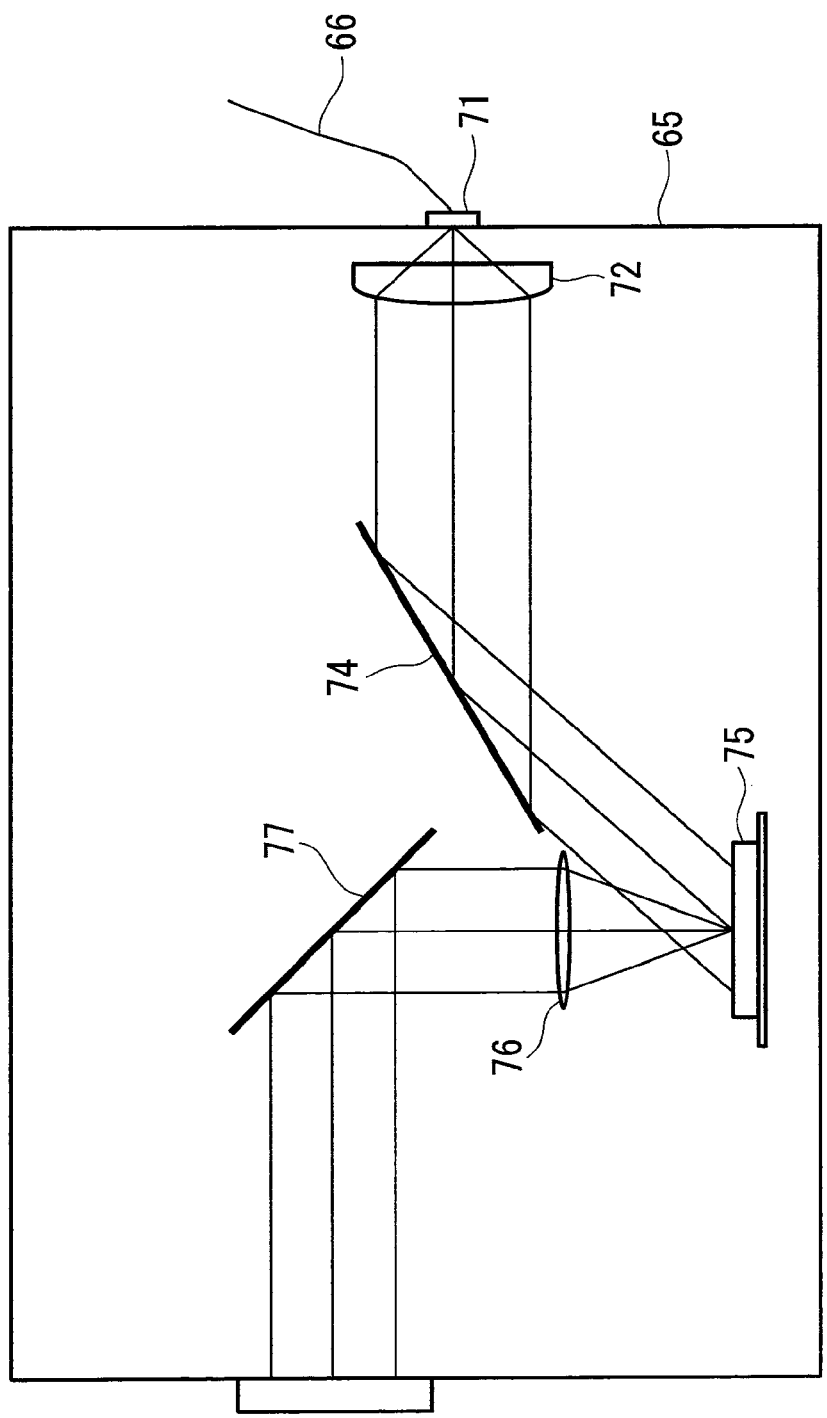
FIG. 16 is a partial enlarged view of a stimulation-position adjusting unit in FIG. 15.

As shown in FIG. 16, the stimulation-position adjusting unit 65 includes a fiber attachment 71 to which the optical fiber 66 is connected, a cylindrical lens 72 that converts the cell-stimulation light guided by the optical fiber 66 into collimated light, a mirror 74 that reflects the cell-stimulation light from the cylindrical lens 72 toward a DMD 75, the DMD (illumination-area adjusting portion) 75 in which a plurality of micro-movable mirrors are arrayed, a lens 76 that collects the cell-stimulation light from the DMD 75, and a mirror 77 that reflects the cell-stimulation light collected by the lens 76 toward the objective lens 14.

The DMD (Digital Micromirror Device) 75 has a configuration in which a plurality of micro-movable mirrors (microelements) are arrayed. By operating (turning ON/OFF) the micro-movable mirrors, part of or the entirety of the cell-stimulation light emitted from the light source 11 is selectively reflected to change the illumination area of the cell-stimulation light on the specimen A.

Figure 17:
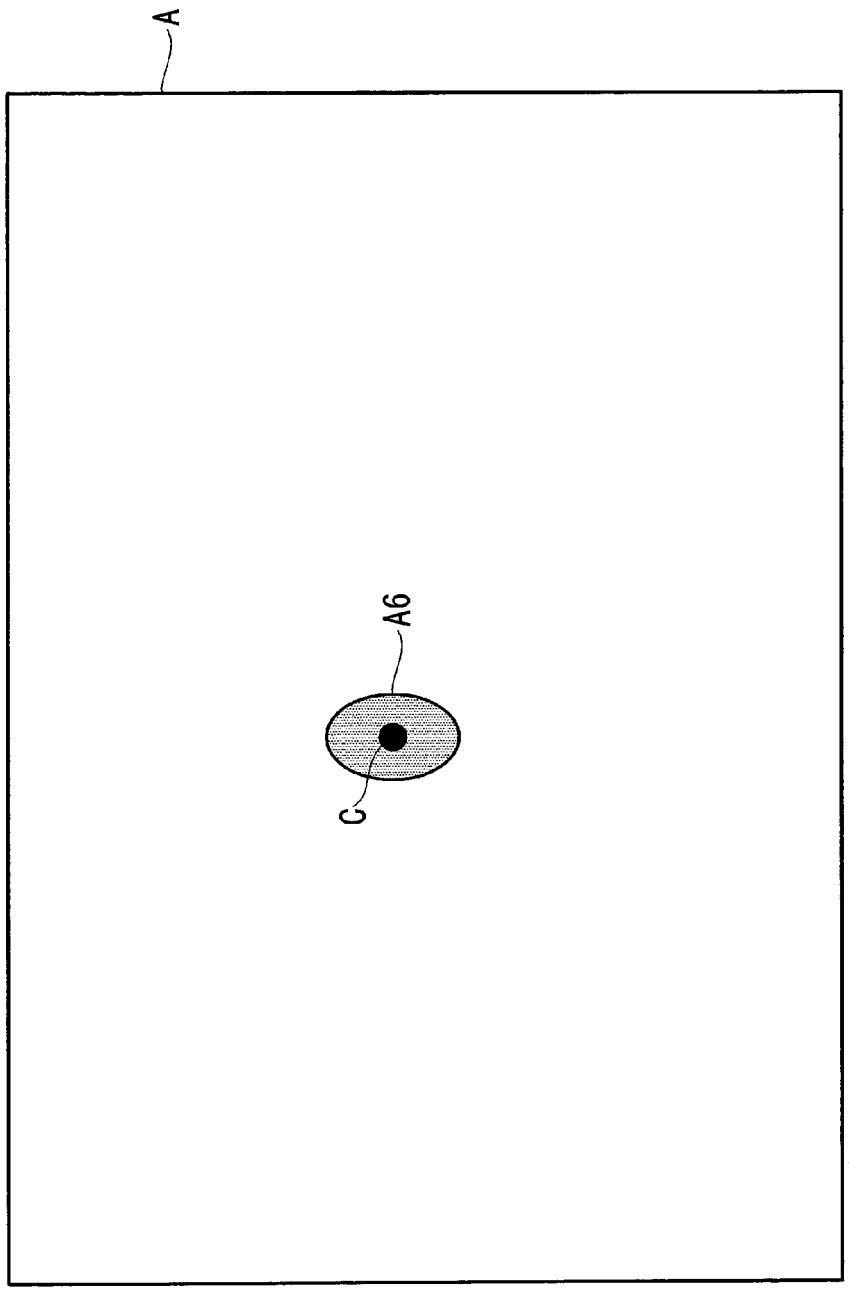
FIG. 17 is a diagram for describing a method of adjusting a stimulation position by the stimulation-position adjusting unit in FIG. 15.

More specifically, by operating (turning ON/OFF) the micro-movable mirrors of the DMD 75, the amount of offset from the center of gravity of the cell area and the size of the spot in an area C illuminated with the cell-stimulation light can be set, as shown in FIG. 17.

A cell observation method using the microscope 3 having the above-described configuration will be described below in accordance with a flowchart shown in FIG. 18.

Figure 11:
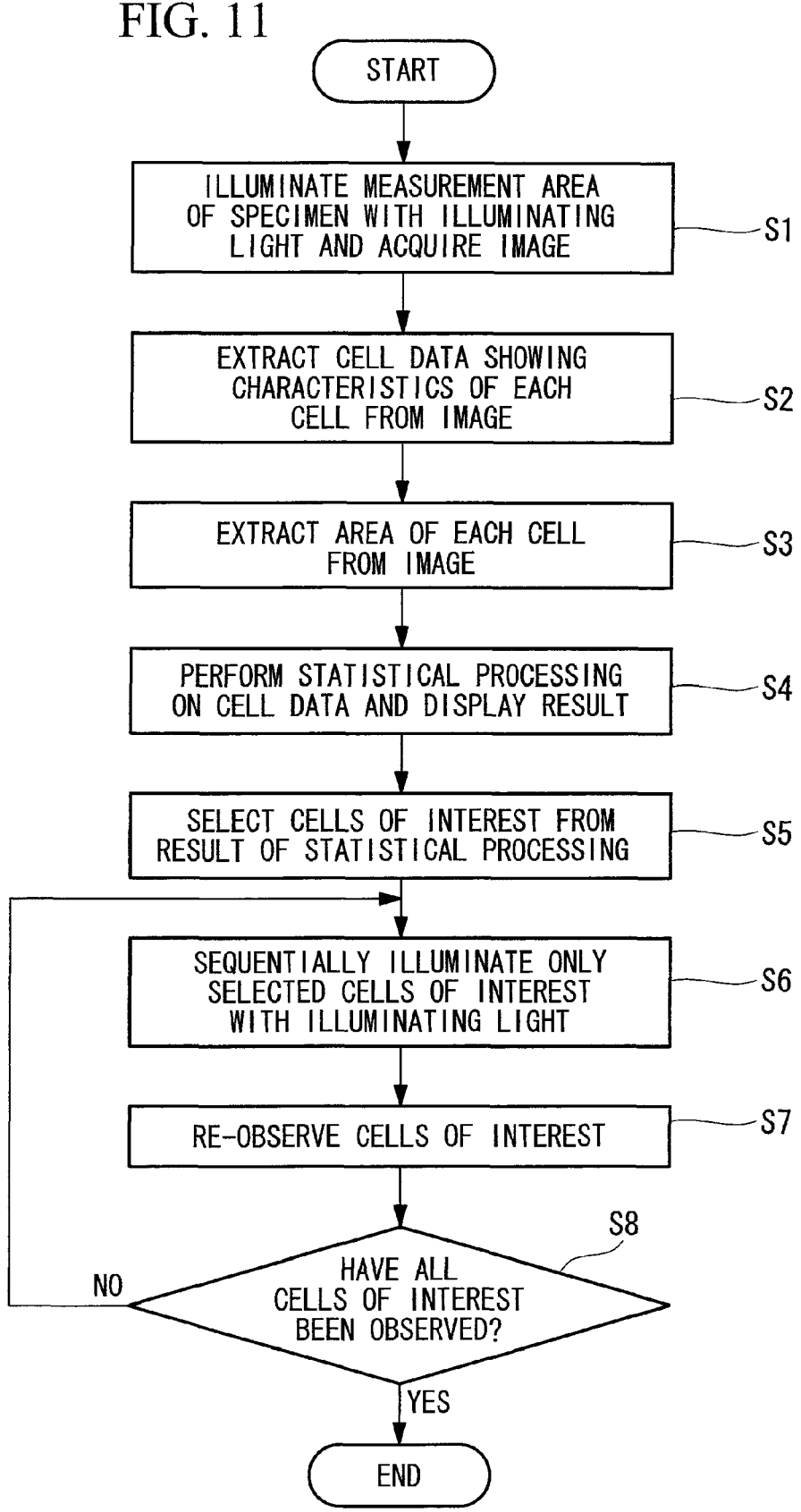
FIG. 11 is a flowchart showing processing executed when re-observation is performed by the microscope in FIG. 1.

Because steps S1 to S5 of the flowchart shown in FIG. 18 are the same as those of the flowchart shown in FIG. 11, a description thereof will be omitted here.

In a cell-of-interest illuminating step S16, the cell areas corresponding to the cells of interest selected in the cell-of-interest selecting step S5 are sequentially illuminated with the illuminating light and the cell-stimulation light.

Next, in a cell-of-interest displaying step S7, images of the cells of interest illuminated with the illuminating light and the cell-stimulation light in the cell-of-interest illuminating step are displayed (re-observation).

Determination is performed as to whether or not all the cells of interest have been subjected to the above-described processing in the cell-of-interest illuminating step S16 and cell-of-interest displaying step S7 (step S8). If there is any unobserved cell of interest, the processing of the cell-of-interest illuminating step S16 and cell-of-interest displaying step S7 is repeated. When all the cells of interest have been subjected to the above-described processing, cell observation ends.

In this manner, in the microscope 3 according to this embodiment, the cell areas corresponding to the cells of interest are illuminated with cell-stimulation light by operating (turning ON/OFF) the micro-movable mirrors of the DMD 75. Thus, it is possible to stimulate cells of interest and then observe the cells of interest that have been stimulated, thus changing state, with the illuminating light.

Furthermore, cells other than the cells of interest can be prevented from being illuminated with the illuminating light and the cell-stimulation light, whereby it is possible to prevent a negative influence due to the illuminating light, such as photobleaching, on the cells other than the cells of interest and the cell-stimulation light.

{Modification}

A modification of the microscope 3 according to this embodiment will be described below with reference to FIG. 19.

In the modification of the microscope 3 according to this embodiment, as shown in FIG. 19, instead of the DMD 75, a scanner (illumination-area adjusting portion) 81 having galvanometer mirrors may be provided in the stimulation-position adjusting unit 65 of the microscope 3 according to this embodiment. Alternatively, instead of a reflective microelement array, such as a DMD, a transmissive microelement array, such as an LCD (liquid crystal array), may be used.

As shown in FIG. 19, the scanner 81 includes a pair of galvanometer mirrors 82 and 83 and is driven by a raster-scan method by changing the pivot angle of these galvanometer mirrors 82 and 83. Thus, the illumination area of the cell-stimulation light on the specimen A from the light source 11 can be adjusted.

Note that, in FIG. 19, the reference numerals 84 and 86 denote mirrors, and the reference numeral 85 denotes a dichroic mirror (not shown in FIG. 15). The dichroic mirror 85 allows the illuminating light from the optical unit 12 and the light from the specimen A, which has been collected by the objective lens 14, to pass therethrough while reflecting the cell-stimulation light from the stimulation-position adjusting unit 65. Thus, the dichroic mirror 85 separates the illuminating light and the light from the specimen A from the cell-stimulation light.

In the microscope 4 according to this modification, the cell areas corresponding to the cells of interest are illuminated with cell-stimulation light by operating the scanner 81. Thus, similarly to the above-described microscope 3, it is possible to stimulate cells of interest and then observe the cells of interest that have been stimulated, thus changing state, with the illuminating light.

Although embodiments of the present invention have been described in detail with reference to the drawings, the concrete configurations are not limited to these embodiments; design changes and the like within a scope not departing from the spirit of the present invention are also encompassed. For example, the present invention does not necessarily have to be applied to the above-described embodiments and modifications, but may be applied to an embodiment in which the above-described embodiments and modifications are appropriately combined; it is not specifically limited.

REFERENCE SIGNS LIST

A: specimen
1, 2, 3, 4: microscope
11: light source
12: optical unit
13: stage
14: objective lens (illumination optical system)
15: PC
16: monitor
17: controller (control unit)
21: lens
22: dichroic mirror
23: scanner (illumination-area adjusting portion)
24: photodetector
31: image generating portion
32: cell-data extracting portion
33: cell-area extracting portion
34: arithmetic portion
35: cell-of-interest selecting portion
36: storage portion
41: communication unit
42: CCD unit
43: DMD unit
55: DMD (illumination-area adjusting portion)
65: stimulation-position adjusting unit
75: DMD (illumination-area adjusting portion)
81: scanner (illumination-area adjusting portion)

The invention claimed is:

1. A cell observation apparatus comprising: an illumination optical system that illuminates a cell group with illuminating light; an illumination-area adjusting portion that adjusts an illumination area of the illuminating light by using the illumination optical system; an image generating portion that generates an image of the cell group illuminated by the illumination optical system; a cell-data extracting portion that extracts data showing characteristics of each cell from the image of the cell group generated by the image generating portion; a cell-area extracting portion that extracts an area of each cell associated with the data of each cell extracted by the cell-data extracting portion; an arithmetic portion that performs statistical processing on the data of each cell extracted by the cell-data extracting portion so as to plot the data of each cell on a scattergram, and that displays the scattergram, wherein the data of each cell plotted on the scattergram includes at least one of an area, a maximum intensity, a minimum intensity, and a circularity of each cell; a cell-of-interest selecting portion that selects a cell of interest from the displayed scattergram based on user input; and a control unit that operates the illumination-area adjusting portion to illuminate only a cell area corresponding to the cell of interest selected by the cell-of-interest selecting portion with the illuminating light.

2. The cell observation apparatus according to claim 1, wherein the illumination-area adjusting portion is a galvanometer scanner that includes a pair of galvanometer mirrors and a pivot mechanism for pivoting the pair of galvanometer mirrors.

3. The cell observation apparatus according to claim 1, wherein the illumination-area adjusting portion is a microelement array that includes a plurality of microelements for deflecting a direction of the illuminating light and a driving mechanism for operating the plurality of microelements to change the deflection direction of the illuminating light.

4. The cell observation apparatus according to claim 1, wherein the illumination optical system illuminates the cell of interest with cell-observation illuminating light.

5. The cell observation apparatus according to claim 1, wherein the illumination optical system emits cell-stimulation light for stimulating the cell of interest.

6. The cell observation apparatus according to claim 1, wherein the illumination-area adjusting portion corrects a size of the area illuminated with the illuminating light depending on a magnification of the illumination optical system.

7. A cell observation method comprising:
illuminating a cell group with illuminating light and acquiring an image of the cell group; extracting data of each cell from the acquired image of the cell group; extracting an area of each cell associated with the extracted data of each cell; performing statistical processing on the extracted data of each cell so as to plot the data of each cell on a scattergram, and displaying the scattergram, wherein the data of each cell plotted on the scattergram includes at least one of an area, a maximum intensity, a minimum intensity, and a circularity of each cell; selecting a cell of interest from the displayed scattergram based on user input; illuminating only a cell area corresponding to the selected cell of interest with the illuminating light; and displaying an image of the cell of interest whose cell area is illuminated with the illuminating light.

* * * * *